United States Patent
Girardeau, Jr. et al.

(10) Patent No.: US 6,404,810 B1
(45) Date of Patent: Jun. 11, 2002

(54) ACTIVATION METHOD IN DATA TRANSCEIVERS

(75) Inventors: James Ward Girardeau, Jr.; Stanley K. Ling, both of Sacramento, CA (US)

(73) Assignee: Level One Communications, Inc., Sacramento, CA (US)

( * ) Notice: Subject to any disclaimer, the term of this patent is extended or adjusted under 35 U.S.C. 154(b) by 0 days.

(21) Appl. No.: 09/290,128

(22) Filed: Apr. 12, 1999

(51) Int. Cl.[7] .................... H03H 7/30; H03H 7/40; H03H 5/159
(52) U.S. Cl. ........................... 375/232; 708/323
(58) Field of Search .................... 375/229, 230, 375/231, 232, 233, 234, 235, 236, 254, 285, 346, 350; 708/300, 305, 314, 322, 323, 819

(56) References Cited

U.S. PATENT DOCUMENTS

| | | | | |
|---|---|---|---|---|
| 4,502,077 A | * | 2/1985 | Morotomi et al. | |
| 4,757,319 A | * | 7/1988 | Lankl | |
| 5,513,209 A | | 4/1996 | Holm | |
| 5,914,983 A | * | 6/1999 | Bowser et al. | 375/232 |

* cited by examiner

*Primary Examiner*—Chi Pham
*Assistant Examiner*—Jean Corrielus
(74) *Attorney, Agent, or Firm*—Merchant & Gould PC

(57) ABSTRACT

An activation method for adaptive equalization in a data transceiver including a plurality of adaptive filters wherein the adaptive filters are adapted with a first type of adaptation method to obtain initial convergence of the adaptive filters during an initial activation of the data transceiver and a second type of adaptation method to optimize performance of recovering the received signals in the presence of noise.

9 Claims, 4 Drawing Sheets

ACTIVATION METHOD IN DATA TRANSCEIVERS

BACKGROUND OF THE INVENTION

1. Field of the Invention

This invention relates in general to the field of digital signal processing in digital communication. More particularly, the invention relates to a data transceiver and an initial activation of adaptive equalization method used in a data transceiver.

2. Description of Related Art

An adaptive equalization method is often-used in a data transceiver to compensate for the amplitude and phase distortions introduced by a transmission channel. Generally, an equalizer is a discrete time filter for compensating amplitude and phase distortions. A channel is a time-varying channel with a typically long time constant compared to the symbol period. The channel may be viewed as quasi-static, with a relatively constant impulse response. Equalizers are also used to recover timing so that the local receiver clock and the remote transmitter clock are synchronous. Usually, the local receiver clock and the remote transmitter clock are asynchronous. If the timing is not recovered, the transmitted signal can be lost or additional incorrect signals can be added. If the receiver clock is slower than the transmitter clock, after a long enough period of time, one sample of the received signal will be lost. On the other hand, if the local receiver clock is faster than the remote transmitter clock, after a long enough period of time, an extra sample of the receiver signal will be obtained. Accordingly, equalizers have been implemented to recover received data and timing in many data transceivers. Often used equalizers include linear equalizers (LE), zero-forcing (ZF) equalizers, mean-square error (MSE) equalizers, etc.

The equalizers also have to be adaptive to compensate continuously for non-idealities of the channel. A data transceiver often uses an adaptive algorithm to correct errors such as inter symbol interference (ISI), noise, etc., that occur in subsequent information bits. Generally, minimizing the inter symbol interference (ISI) enhances noise. Accordingly, different adaptive equalizations are designed to meet different criteria for the noise and ISI.

When using blind equalization in a data transceiver, a key system requirement is to initially recover received timing in the data transceiver. When using a minimum mean square error (MSE) update method, adaptive algorithms can be optimized to provide an optimal tradeoff between noise and ISI. However, the minimum MSE adaptation is slower than a zero-forcing (ZF) adaptation which takes into account only ISI.

Therefore, there is a need for an improved adaptive equalization method in a data transceiver which provides a mechanism to quickly and reliably recover initial timing, while still providing optimal performance in the presence of noise.

SUMMARY OF THE INVENTION

To overcome the limitations in the prior art described above, and to overcome other limitations that will become apparent upon reading and understanding the present specification, the present invention provides a mechanism to quickly and reliably recover initial timing, while still providing optimal performance in the presence of noise.

The present invention discloses an activation method for adaptive equalization in a data transceiver. In the initial stages of activation, the adaptive equalization uses a zero forcing (ZF) adaptation. This allows the data transceiver to converge reliably and quickly. Thus, the system can achieve good signal-noise-ratio (SNR) and lock the received timing. After initialization, the adaptive equalization is changed to a minimum mean square error (MSE) adaptation, such that better performance of recovering signals can be achieved in the presence of noise.

In one embodiment of the present invention, an activation method for adaptive equalization in a data transceiver including a plurality of adaptive filters, includes adapting an adaptive filter with a zero forcing (ZF) adaptation to obtain initial convergence during activation of the data transceiver; and adapting the adaptive filter with a minimum mean square error (MSE) adaptation to optimize performance of recovering signals in the presence of noise. One or more of the adaptive filters in the data transceiver may utilize this activation method.

In another embodiment of the present invention, an activation method for adaptive equalization in a data transceiver including a plurality of adaptive filters, includes adapting an adaptive filter with a first type of adaptation to obtain initial convergence during activation of the data transceiver; and adapting the adaptive filter with a second type of adaptation to optimize performance of recovering signals in the presence of noise. One or more of the adaptive filters in the data transceiver may utilize this activation method.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION

In the following description of the exemplary embodiment, reference is made to the accompanying drawings which form a part hereof, and in which is shown by way of illustration the specific embodiment in which the invention may be practiced. It is to be understood that other embodiments may be utilized as structural or implementing changes may be made without departing from the scope of the present invention.

The present invention provides a mechanism to quickly and reliably recover initial timing, while still providing optimal performance in the presence of noise.

The present invention discloses an activation method for adaptive equalization in a data transceiver. In the initial stages of activation, the adaptive equalization uses a first type of adaptation, such as a zero forcing (ZF) adaptation. This allows the data transceiver to converge reliably and quickly. Thus, the system can achieve good signal-noise-ratio (SNR) and lock the received timing. After initialization, the adaptive equalization is changed to a second type of adaptation, such as a minimum mean square error (MSE) adaptation, such that better performance can be achieved in the presence of noise. The ZF adaptation, MSE adaptation and other suitable adaptation are not discussed here in detail as they are commonly known in the field of digital communication.

Figure 1:
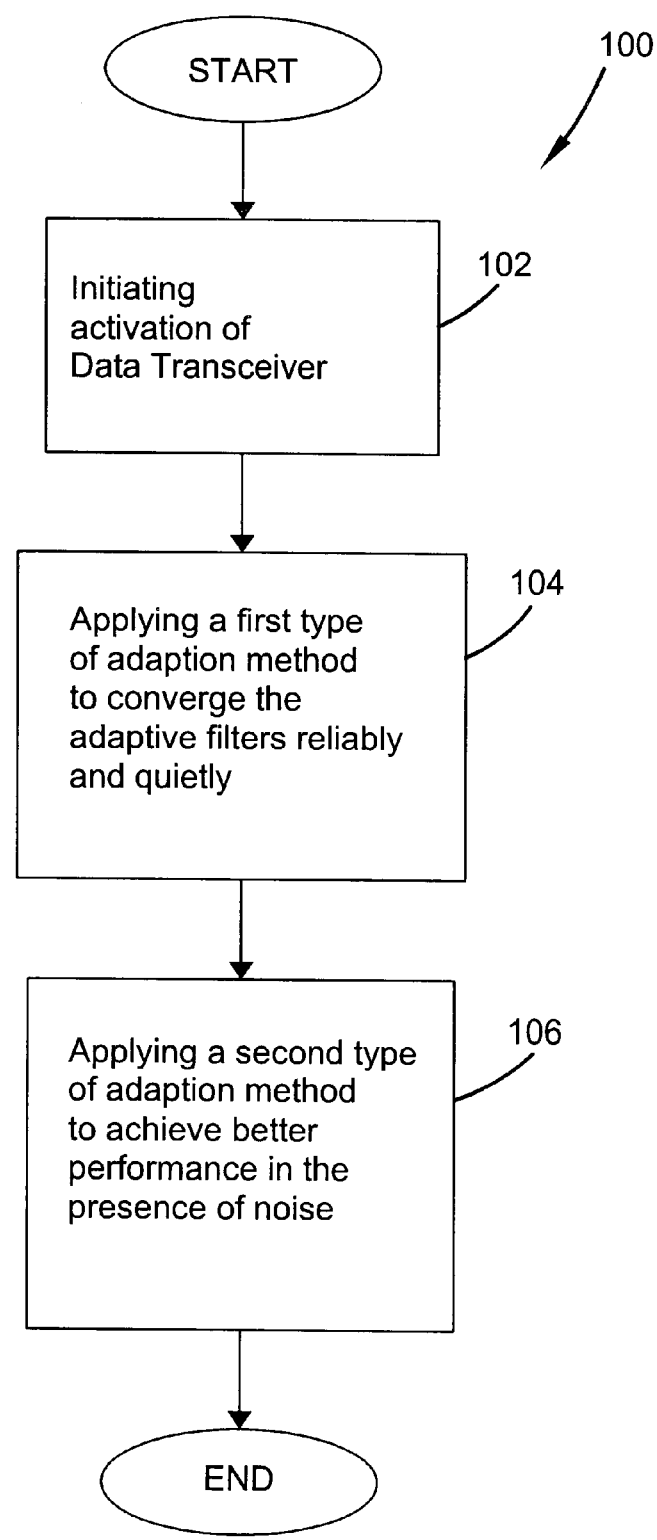
FIG. 1 illustrates a flow chart of an activation method for an adaptive equalization in a data transceiver in accordance with the principles of the present invention.

FIG. 1 illustrates an activation operation 100 for adaptive equalization of a data transceiver in accordance with the principles of the present invention. In box 102, the operation initializes the data transceiver. A first type of adaptation method is used to converge adaptive filters of the data transceiver reliably and quickly in box 104. Once the data transceiver is activated, a second type of adaptation method is used to achieve better performance of recovering signals in the presence of noise in box 106.

Figure 2:
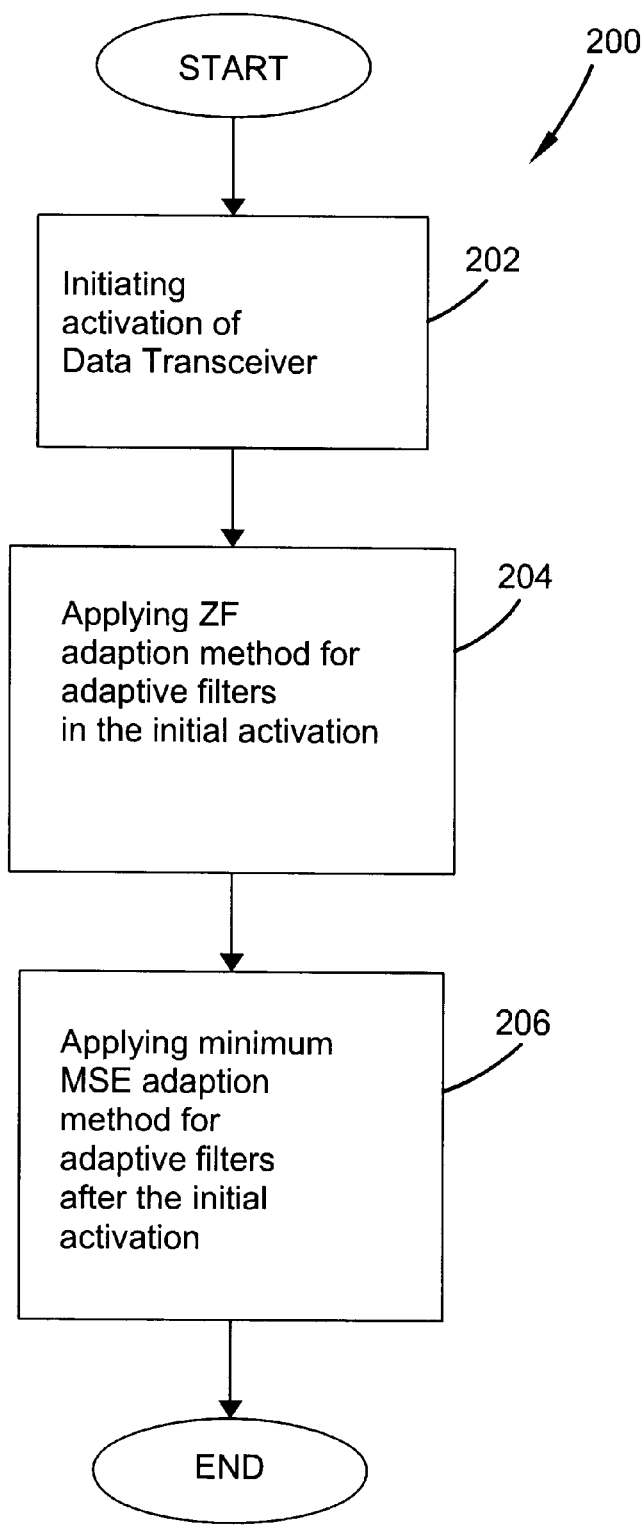
FIG. 2 illustrates a flow chart of an activation method for another adaptive equalization in a data transceiver in accordance with the principles of the present invention.

FIG. 2 illustrates an activation operation 200 for an exemplary adaptive equalization in a data transceiver in accordance with the principles of the present invention. In box 202, the operation initializes the data transceiver. A zero-forcing (ZF) adaptation method is used to converge adaptive filters of the data transceiver reliably and quickly in box 204. Once the data transceiver is activated, a minimum mean square error (MSE) adaptation method is used to achieve better performance of recovering signals in the presence of noise in box 206.

Figure 3:
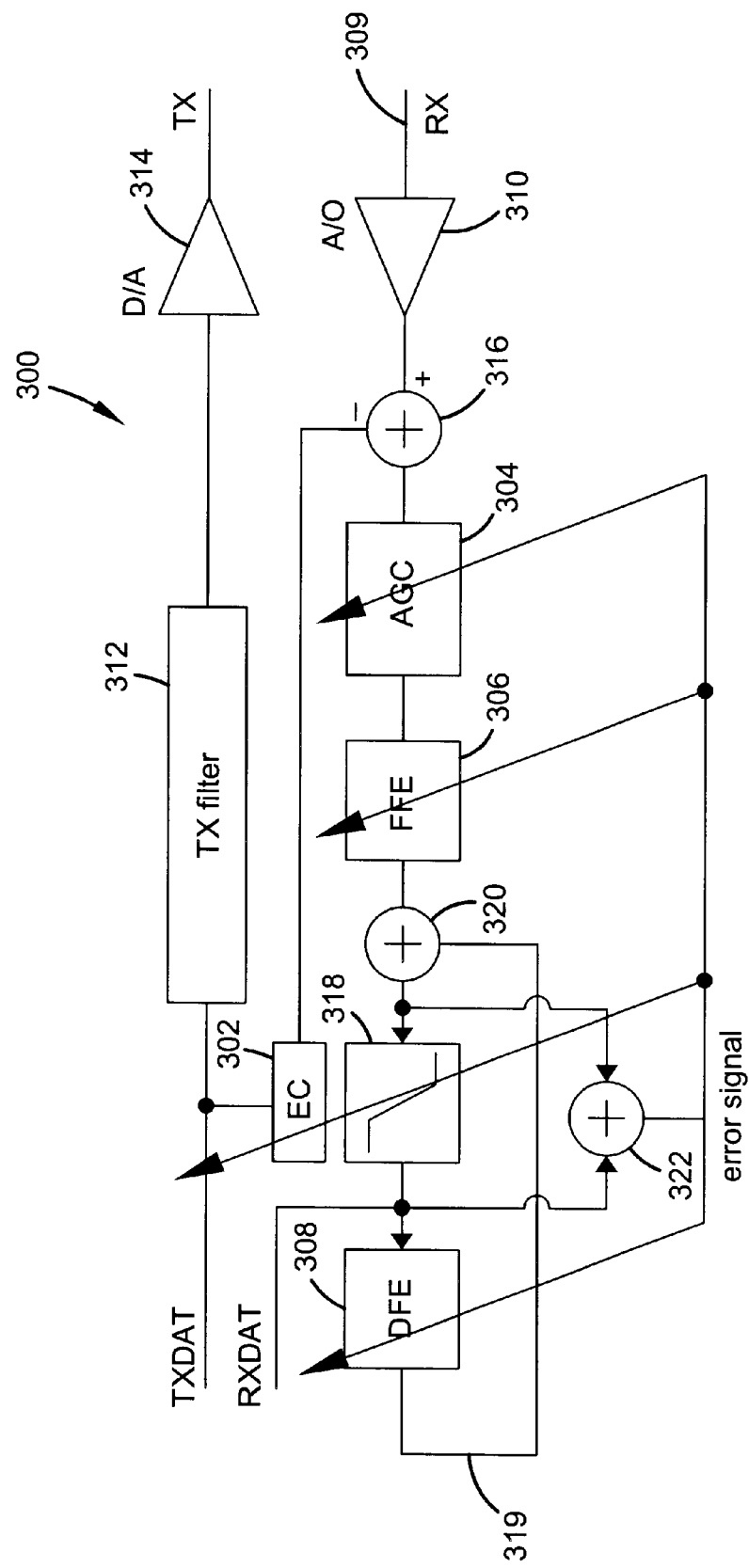
FIG. 3 illustrates a block diagram of a simplified data transceiver in which an activation method for adaptive equalization can be used in accordance with the principles of the present invention.

FIG. 3 illustrates a block diagram of a simplified data transceiver 300 in which the activation operation, such as 100, 200, for adaptive equalization is used in accordance with the principles of the present invention. The data transceiver 300 includes a plurality of adaptive filters. The adaptive filters include an echo canceller (EC) 302, an automatic gain control (AGC) 304, a feedback forward equalizer (FFE) 306, and a decision feedback equalizer (DFE) 308. The EC 302 removes the transmit signals (TXDAT) from the received signals RX. The received signals RX are converted by an A/D 310. A transmitter filter (TX FILTER) 312 shapes the transmit signal spectrum. A D/A converter 314 converts the transmit signals to analog transmit signals (TX).

The adaptive filters, EC, AGC, FFE, and DFE, are allowed to adapt from the initial activation stage. In an example of the activation operation 200, the ZF adaptation is applied first, and the MSE adaptation is applied thereafter for some of the filters. By using the ZF adaptation, the error_signals are forced to zero errors for adaptation.

In the receiving data path 309, the received signals are converted by the A/D 310. The converted signals are inputted into an adder or other equivalent means 316, whereby the EC 302 removes the transmit signals (TXDAT) from the received signals. The received signals are then sent to the AGC 304. The AGC 304 optimizes the received signal level. The FFE 306 receives the optimized signals from the AGC 304, whereby the FFE 306 whitens noise from the signals and removes pre-sample or precursor distortion. The DFE 308 removes post-sample or postcursor distortion. A slicer 318 recovers the received signals RXDAT from the FFE 306 and the DFE 308. A feedback loop 319 from the DFE 308 includes an adder or other equivalent means 320. Error signals are generated from the input and output of the slicer 318 by an error generator 322. The error signals are generated to adapt the adaptive filters, AGC, FFE, EC, and DFE, both in the first type of adaptation method, e.g. the ZF adaptation method, at the initiation stage, and a second type of adaptation method, e.g. the minimum MSE adaptation method, after the initiation stage. It is appreciated that the update or change from the first adaptation method to the second adaptation method may can be readily implemented by a person in the control art.

Figure 4:
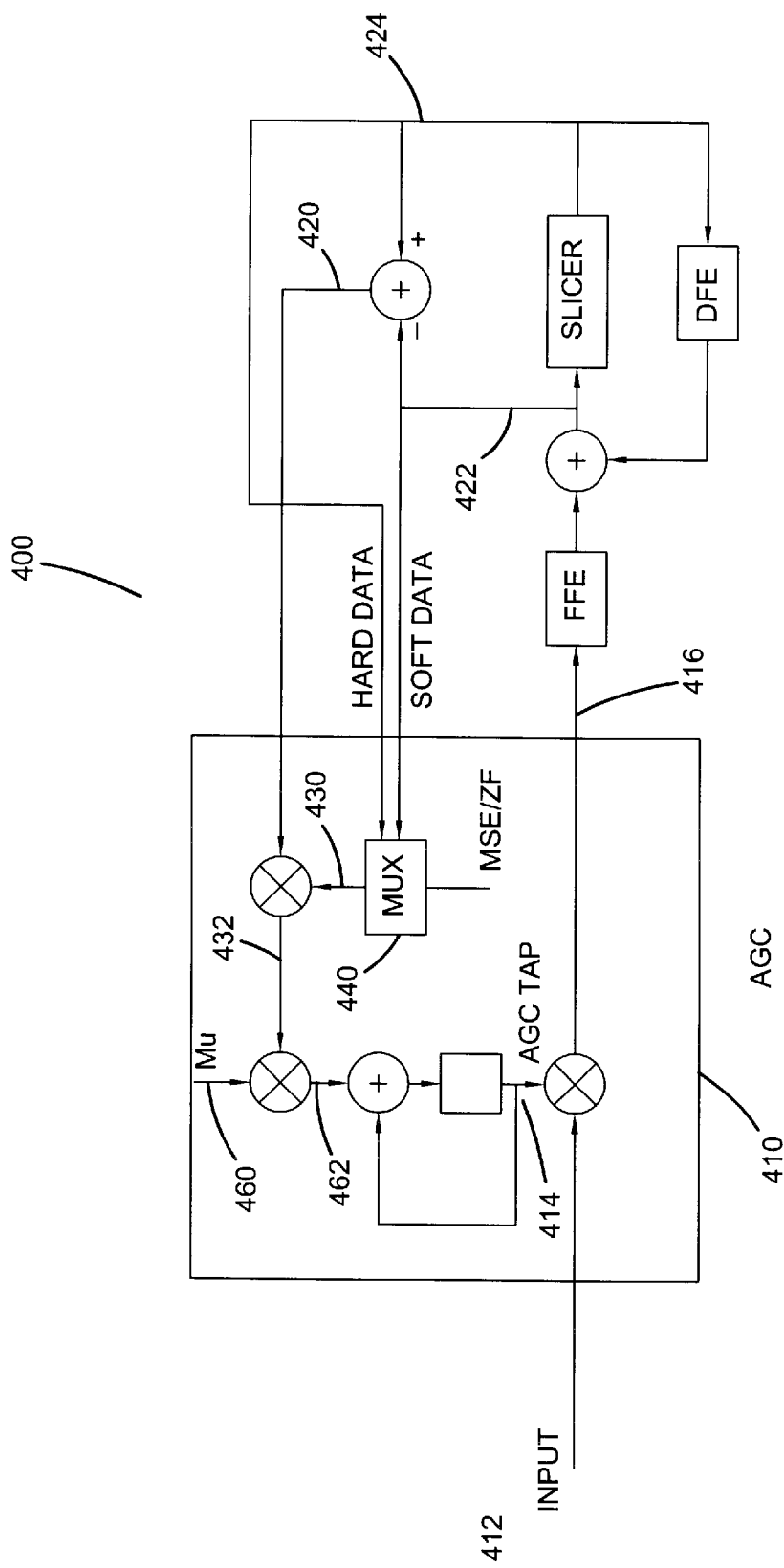
FIG. 4 illustrates a block diagram providing greater detail of the operation of the automatic gain control circuit shown in FIG. 3.

FIG. 4 illustrates a block diagram 400 providing greater detail of the operation of the automatic gain control (AGC) circuit shown in FIG. 3. In FIG. 4, the AGC 410 receives an input signal 412. The input signal 412 is multiplied by a constant 414, here referred to as the AGC tap, to produce the AGC output signal 416. An adaptation mode is provided for adapting the gain, i.e., constant 414, to provide the proper gain. The slicer error signal 420 is computed by subtracting the slicer input 422 from the slicer output 424. The slicer output 424 will herein be referred to as hard data and the slicer input 422 will herein be referred to as soft data.

The slicer error signal 420 is correlated with a data signal 430 from a multiplexer 440 by multiplying the slicer error signal 420 by the data signal 430 to produce a correlated output signal 432. The multiplexer 440 has an control signal input 442 which selects between a ZF function and the MSE function. The multiplexer 440 selects either the hard data 424 or the soft data 422. For example, for an initial adaptation, the hard data 424 may be selected and a second adaptation may use the soft data 422. The correlated output signal 432 is multiplied by an adaptation constant, $\mu$, 460 to produce an adapted output 462. The adapted output is added to the previous AGC tap 414 to produce a new AGC tap.

Thus, the adaptations may be represented as:

$$(ZF) \quad AGC(\text{new}) = AGC(\text{old}) + (\mu * \text{slider error} * \text{hard data}); \text{ and}$$

$$(MSE) \quad AGC(\text{new}) = AGC(\text{old}) + (\mu * \text{slider error} * \text{soft data})$$

It is also appreciated to a person skilled in the art that other types of updates or changes between or among different adaptation methods can be used without departing from the principles of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An activation method for adaptive equalization in a data transceiver including a plurality of adaptive filters, comprising:

adapting at least one adaptive filter with a-zero forcing (ZF) adaptation to obtain initial convergence during activation of data transceiver, wherein the zero forcing adaptation comprises adding a previous automatic gain control constant to a product of an adaptation constant, a slicer output and a slicer error signal; and adapting the at least one adaptive filter with a second type of adaptation to optimize performance of the data transceiver in presence of noise.

2. The activation method of claim 1 wherein the second first type of adaptation comprises a minimum mean square error (MSE) function.

3. The activation method of claim 2 wherein the minimum mean square error function comprises adding a previous automatic gain control constant to the product of an adaptation constant, a slicer input and a slicer error signal.

4. An activation method for adaptive equalization in a data transceiver including a plurality of adaptive filters, comprising:

adapting at least one adaptive filter with a first type of adaptation to obtain initial convergence during activation of data transceiver; and adapting the at least one adaptive filter with a minimum mean square error (MSE) adaptation to optimize performance of the data transceiver in presence of noise, wherein the minimum mean square error adaptation comprises adding a previous automatic gain control constant to a product of an adaptation constant, a slicer output and a slicer error signal.

5. The activation method of claim 4 wherein the first type adaptation comprises a zero forcing (ZF) function.

6. The activation method of claim 5 wherein the zero forcing adaptation comprises adding a previous automatic gain control constant to a product of an adaptation constant, a slicer output and a slicer error signal.

7. An activation method for adaptive equalization in a data transceiver including a plurality of adaptive filters, comprising:

adapting at least one adaptive filter with a first type of adaptation to obtain initial convergence during activation of data transceiver; and adapting the at least one adaptive filter with a second type of adaptation to optimize performance of the data transceiver in presence of noise;

wherein the first type of adaptation and the second type of adaptation comprise adding a previous automatic gain control constant to a product of an adaptation constant, a slicer output and a slicer error signal.

8. The activation method of claim 7 wherein the first type of adaptation comprises a zero forcing (ZF) function.

9. The activation method of claim 7 wherein the second type of adaptation comprises a minimum mean square error (MSE) function.

\* \* \* \* \*